United States Patent [19]

Parker

[11] Patent Number: 4,964,653
[45] Date of Patent: Oct. 23, 1990

[54] SELF-SKINNED FOAM COMPONENT FOR AN INFLATABLE RESTRAINT DOOR ASSEMBLY

[75] Inventor: Kent L. Parker, Barrington, N.H.

[73] Assignee: Davidson Textron Inc., Dover, N.H.

[21] Appl. No.: 398,252

[22] Filed: Aug. 24, 1989

[51] Int. Cl.⁵ ............................................. B60R 21/16
[52] U.S. Cl. ..................................... 280/732; 780/731
[58] Field of Search ................................ 280/731, 732

[56] References Cited

U.S. PATENT DOCUMENTS

| 4,752,083 | 6/1988 | Honda | 280/731 |
| 4,852,907 | 8/1989 | Shiriki et al. | 280/731 |

Primary Examiner—Kenneth R. Rice
Attorney, Agent, or Firm—John C. Evans

[57] ABSTRACT

A door assembly for an opening through which an inflatable restraint safety device may be deployed including a frame for supporting an inflatable restraint safety device and an opening presented in the frame, a door is disposed in the opening and is capable of rapidly moving so that the inflatable restraint device may be deployed through the opening, the door includes an impact plate portion and a foam portion bonded to the impact plate portion with the foam portion including a microcellular component having a first predetermined density and an integral outer skin component distinct from the microcellular component and formed integral with the microcellular component and which has a second predetermined density which is greater than the first predetermined density of the microcellular component for providing an aesthetically pleasing non-separable surface on the microcellular component.

10 Claims, 1 Drawing Sheet

U.S. Patent
Oct. 23, 1990
4,964,653
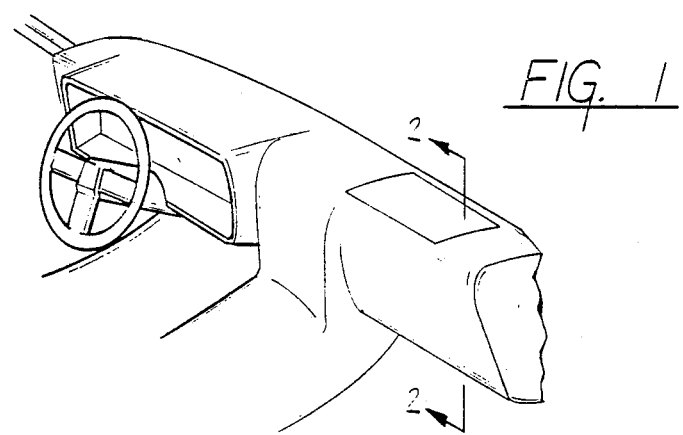
FIG. 1
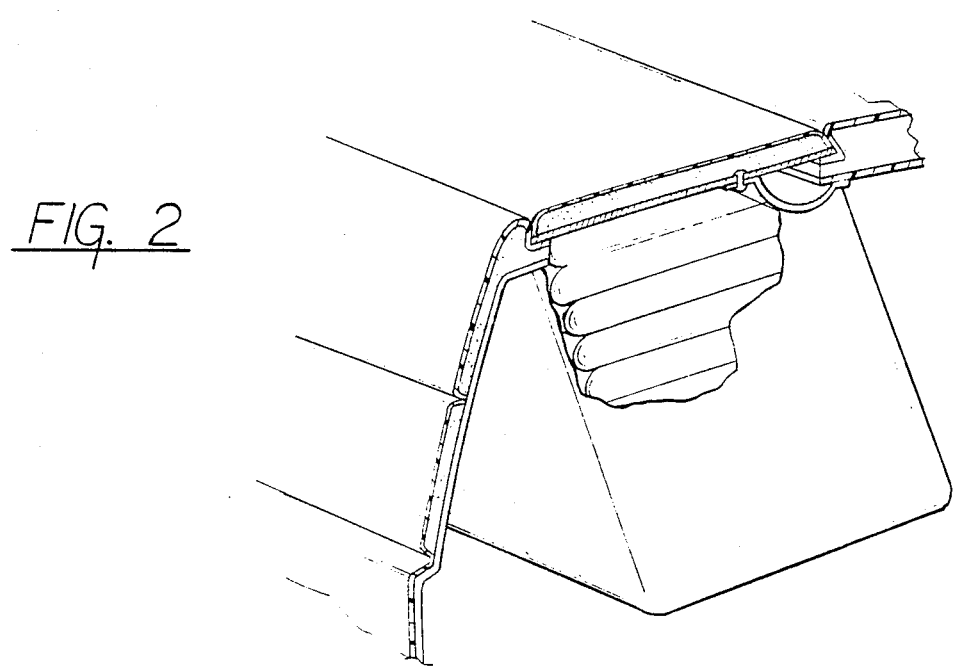
FIG. 2
FIG. 3
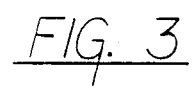

SELF-SKINNED FOAM COMPONENT FOR AN INFLATABLE RESTRAINT DOOR ASSEMBLY

BACKGROUND OF THE INVENTION (1) Technical Field

This invention relates to door systems used in the deployment of inflatable restraint safety air bags such as during an automotive collision.

(2) Description of The Prior Art

The deployment of inflatable restraint safety devices into the passenger compartment of a vehicle has presented many engineering challenges. Many of these challenges have been met and problems solved in providing an efficient and safe way to deploy the restraint. One problem that still exists is the occurrence of flying particles and debris which may result during the deployment of the inflatable restraint. The function of the inflatable restraint door assembly is to create a opening in a support structure, commonly an instrument panel, for deployment of the inflatable restraint air bag system during collision situations. The door is displaced out of the instrument panel by the force of the air bag expanding. The opening left behind in the instrument panel allows the air bag to expand into the occupant area. A major concern with inflatable restraint door designs is the occurrence of flying debris during the air bag deployment. Any amount of debris deposited in the occupant area after the bag deployment is considered undesirable and constitutes a failure of the design being evaluated.

An early example of an inflatable safety device can be found in U.S. Pat. No. 3,514,124 issued to Richardson on Mar. 26, 1970. The Richardson '124 patent discloses an inflatable vehicle safety device and an associated exterior panel 22 which is releaseably connected to a nonmoveable member by strips of molding tape 26, 27. When the inflatable restraint is deployed, the panel 22 moves toward the front side of the back seat of the vehicle and the molding tapes 26, 27 are torn or sheared to release the panel 22 during the process. This can cause particles of the tape and other matter to become projectiles within the passenger compartment of the vehicle.

U.S. Pat. No. 3,708,179 issued to Hulten on Jan. 2, 1973 discloses a door assembly for an opening through which an inflatable safety device is deployed. A frame 30 pivotally supports a pair of door elements 38. As is often the case, the inflatable restraint is stored in a compartment on a dashboard or crash pad 12 or some other highly visible place. Typically and as disclosed in the Hulten '179 patent, these visible areas structurally include a base member 14 which supports a cushioning layer 16 which is usually made of urethane foam. A plastisol skin 18, such as vinyl, is then bonded to the urethane foam. Similarly, the front surface 40 of each door element of the Hulten '179 disclosure is covered with the plastisol skin in order to improve the esthetics of the door assembly.

Unfortunately and as often is the case, with time, the plastisol skin has been known to crack or to be susceptible to tearing especially when subjected to cold temperatures.

The subject invention overcomes these deficiencies in the prior art in a safe, superior, and cost effective inflatable restraint door assembly.

SUMMARY OF THE INVENTION AND ADVANTAGES

The subject invention is directed toward a door assembly for an opening through which an inflatable restraint safety device maybe deployed including a frame for supporting an inflatable restraint safety device and having an opening presented in the frame. A door is disposed in the opening and is capable of rapidly moving so that the inflatable restraint safety device may be deployed through the opening. The door includes an impact plate portion and a foam portion bonded to the impact plate portion. The foam portion includes a microcellular component which has a first predetermined density and an integral outer skin component which is distinct from the microcellular component but formed integral with the microcellular component and which has a second predetermined density which is greater than the first predetermined density of the microcellular component. Thus, the foam portion of the door assembly of the present invention provides a cushioning foam layer which has an integral outer skin which is an esthetically pleasing and non-seperable surface with respect to the microcellular component.

Accordingly, the subject invention overcomes the problems of the prior art by utilizing the technology for employing microcellular foam which has a continuous integral skin formed by the urethane itself, thus eliminating the application of a separately formed polyvinylchloride shell or skin to cover and protect the foam urethane in an inflatable restraint door assembly. The technology of self skinning microcellular urethane foam can be found, for example, in the disclosures of U.S. Pat. No. 3,527,852 issued to Thill on Sept. 8, 1970; U.S. Pat. No. 3,555,130 issued to Feuer et al on Jan. 12, 1971; and U.S. Pat. No. 3,575,896 issued to Khan on Apr. 20, 1971.

The inflatable restraint door assembly of the subject invention which utilizes the self skinning microcellular urethane foam has the advantages of providing an esthetically pleasing, soft surface with a luxurious feel while being structurally supported by an impact plate. The subject invention eliminates the need for a separate polyvinylchloride skin and the attendant adhesion problems associated therewith. Further, the integral skin of the subject invention is less susceptible to separation by cracking or cracking under cold temperature conditions. Consequently, the present invention is better able to meet standards for reduced flying debris during deployment of the air bag. The door assembly of the subject invention may be manufactured with less processing steps and less tools and there are no adhesion problems associated with the urethane foam to the impact plate.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of a conventional dashboard which is one possible area from which an inflatable restraint may be deployed;

FIG. 2 is a partially broken away cross-sectional side view taken substantially along lines 2—2 of FIG. 1; and FIG. 3 is a cross-sectional side view of the self skinned foam component of the door assembly of the subject invention.

DESCRIPTION OF THE PREFERRED EMBODIMENT

A door assembly for an opening through which an inflatable restraint safety device may be deployed is generally shown at 10 in one of its typical applications on a dashboard, generally indicated at 12, of a vehicle in FIG. 1. The dashboard 12 is located in the front portion of a vehicle and has a space 14 provided for gauges located forward of the steering wheel 16 on the driver side of the vehicle. In one embodiment, and for purposes of illustration only, the door assembly 10 of the instant invention is shown disposed on the passenger side of the dashboard 12 in the front seat area of a vehicle but may be disposed anywhere within the passenger compartment of a vehicle.

Referring now to FIG. 2, the dashboard 12 forms a frame generally indicated at 18, for supporting an inflatable restraint safety device 20 within a compartment 22 in the frame 18. The inflatable restraint safety device 20 may be of any type calculated for rapid deployment through an opening 24 presented in the frame. The frame 18 of the dashboard 12 typically includes a rigid member 26 which may be made of metal, hard plastic or any other load bearing material. The rigid member 26 is bolted to and supported by other structural components of the vehicle. The frame 18 further includes a softer foam layer 28 bonded to the rigid member 26. The foam layer 28 of the frame 18 of a dashboard 12 is often made of polyurethane foam to which is then bonded a polyvinylchloride skin 30 such as vinyl which has an exterior appearance which is esthetically pleasing as is commonly known in the art.

A door, generally shown at 32 in FIG. 3, is disposed in the opening 24 and is capable of rapidly moving so that the inflatable restraint safety device 20 may be deployed through the opening 24. The door 32 includes an impact plate portion 34 and a foam portion, generally indicated at 36, bonded to the impact plate portion 34. The foam portion 36 includes a microcellular component 38 having a first predetermined density and an integral outer skin 40 distinct from the microcellular component 38 and formed integral with the microcellular component 38. However, the integral outer skin component 40 has a second predetermined density which is greater than the first predetermined density of the microcellular component 38. Further, the integral outer skin provides an esthetically pleasing nonseparable surface on the microcellular component 38 which will not crack or chip so as to form flying projectiles within the passenger compartment during the deployment of the inflatable restraint safety device.

The foam portion 36 is made of a self skinning microcellular urethane foam of the type as disclosed in the prior art patents as set forth above. The impact plate 34 may be a metallic plate such as an aluminum insert substrate or may be any other load bearing material.

The impact plate 34 closely corresponds to the opening 24 in the frame 18. It may rest upon ledges 42 presented by the frame 18. The door assembly further includes a hinge means, generally indicated at 44, for hingedly connecting the door 32 to the frame 18. Accordingly, the door 32 is moveable between open and closed positions with respect to the opening 24. The hinge means 44 includes a tether 46 having first and second ends 48, 50 respectively. The tether 46 is fixedly attached at the first end 48 to the door 32 at the impact plate 34 and fixedly attached at its second end 50 to the frame 18. In this way, the door 32 is able to rapidly move from its closed to its open position with respect to the opening 24 while being hingedly connected to the frame 18.

The door assembly of the subject invention thereby provides a soft skin foam component for an inflatable restraint door application which can successfully function in all different environments and which is not susceptible to producing flying debris within the vehicle passenger compartment during the instrument restraint air bag deployment. Further, the subject invention may be manufactured with less steps and in a more cost effective manner than the assemblies in the prior art.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that within the scope of the appended claims, the invention may be practiced otherwise than as specifically described.

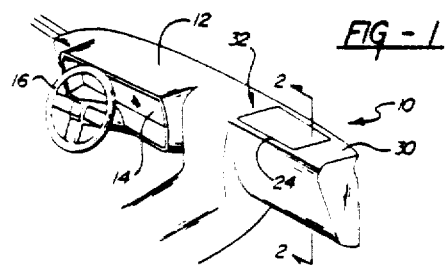

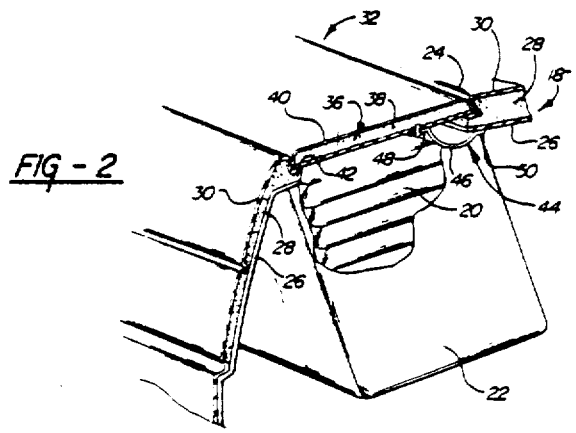

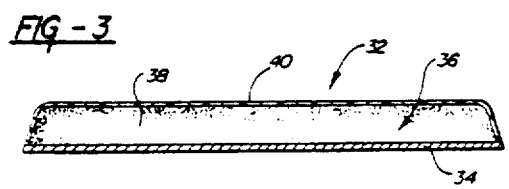

I claim:

1. A door assembly for an opening through which an inflatable restraint safety device may be deployed, said assembly comprising;
    a frame for supporting an inflatable restraint safety device and an opening presented in said frame;
    a door disposed in said opening and capable of rapidly moving so that said inflatable restraint device may be deployed through said opening;
    said assembly characterized by said door including an impact plate portion and a foam portion bonded to said impact plate portion with said foam portion including a microcellular component having a first predetermined density and an integral outer skin component distinct from said microcellular component and formed integral with said microcellular component and having a second predetermined density which is greater than said first predetermined density of said microcellular component for providing an aesthetically pleasing non-separable surface on said microcellular component.

2. An assembly as set forth in claim 1 further characterized by said foam portion being a self skinning microcellular urethane foam.

3. An assembly as set forth in claim 2 further characterized by said impact plate being a metallic plate which closely corresponds to said opening in said frame.

4. An assembly as set forth in claim 3 further characterized by including hinge means for hingedly connecting said door to said frame, said door being moveable between open and closed positions with respect to said opening.

5. An assembly as set forth in claim 4 further characterized by said hinge means including a tether having first and second ends, said tether being fixedly attached at said first end to said door and fixedly attached at said second end to said frame.

6. A vehicle assembly comprising;
    a door assembly for an opening through which an inflatable restraint safety device may be deployed;
    a frame for supporting an inflatable restraint safety device and an opening presented in said frame;
    said door assembly disposed in said opening and capable of rapidly moving out of said opening so that said inflatable restraint device may be deployed through said opening;

said assembly characterized by said door including an impact plate portion and a foam portion bonded to said impact plate portion with said foam portion including a microcellular component having a first predetermined density and an integral outer skin component distinct from said microcellular component and formed integral with said microcellular component and having a second predetermined density which is greater than said first predetermined density of said microcellular component for providing an aesthetically pleasing non-separable surface on said microcellular component.

7. An assembly as set forth in claim 6 further characterized by said foam portion being a self skinning microcellular urethane foam.

8. An assembly as set forth in claim 7 further characterized by said impact plate being a metallic plate which closely corresponds to said opening in said frame.

9. An assembly as set forth in claim 8 further characterized by including hinge means for hingedly connecting said door to said frame, said door being moveable between open and closed positions with respect to said opening.

10. An assembly as set forth in claim 9 further characterized by said hinge means including a tether having first and second ends, said tether being fixedly attached at said first end to said door and fixedly attached at said second end to said frame.

* * * * *

UNITED STATES PATENT AND TRADEMARK OFFICE
CERTIFICATE OF CORRECTION

PATENT NO. : 4,964,653

DATED : October 23, 1990

INVENTOR(S) : Kent L. Parker

It is certified that error appears in the above-identified patent and that said Letters Patent is hereby corrected as shown below:

The title page showing the illustrative figure should be deleted to be replaced with the attached title page.

Sheet 1 of the drawings consisting of Figs. 1-3, should be deleted to be replaced with the sheet of drawings, consisting of Figs. 1-3, as shown on the attached page.

Signed and Sealed this

Eighteenth Day of August, 1992

Attest:

DOUGLAS B. COMER

Attesting Officer

Acting Commissioner of Patents and Trademarks

United States Patent [19]
Parker

[11] Patent Number: 4,964,653
[45] Date of Patent: Oct. 23, 1990

[54] SELF-SKINNED FOAM COMPONENT FOR AN INFLATABLE RESTRAINT DOOR ASSEMBLY

[75] Inventor: Kent L. Parker, Barrington, N.H.

[73] Assignee: Davidson Textron Inc., Dover, N.H.

[21] Appl. No.: 398,252

[22] Filed: Aug. 24, 1989

[51] Int. Cl.$^5$ .............................................. B60R 21/16
[52] U.S. Cl. ................................... 280/732; 780/731
[58] Field of Search ................................ 280/731, 732

[56] References Cited

U.S. PATENT DOCUMENTS

| | | | |
|---|---|---|---|
| 4,752,083 | 6/1988 | Honda | 280/731 |
| 4,852,907 | 8/1989 | Shiriki et al. | 280/731 |

Primary Examiner—Kenneth R. Rice
Attorney, Agent, or Firm—John C. Evans

[57] ABSTRACT

A door assembly for an opening through which an inflatable restraint safety device may be deployed including a frame for supporting an inflatable restraint safety device and an opening presented in the frame, a door is disposed in the opening and is capable of rapidly moving so that the inflatable restraint device may be deployed through the opening, the door includes an impact plate portion and a foam portion bonded to the impact plate portion with the foam portion including a microcellular component having a first predetermined density and an integral outer skin component distinct from the microcellular component and formed integral with the microcellular component and which has a second predetermined density which is greater than the first predetermined density of the microcellular component for providing an aesthetically pleasing non-separable surface on the microcellular component.

10 Claims, 1 Drawing Sheet

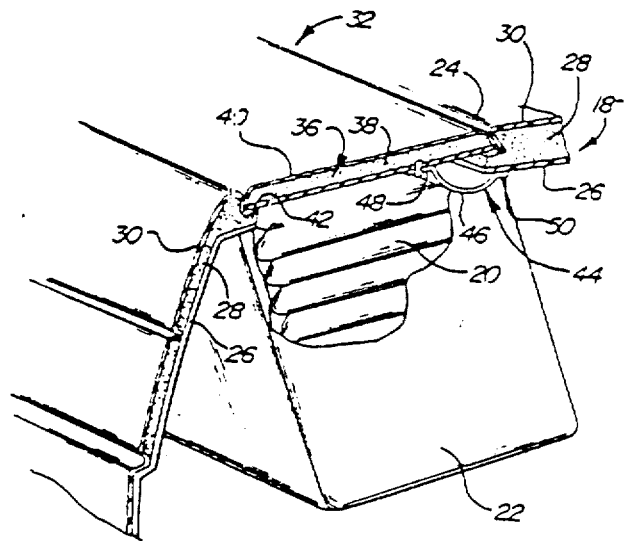

UNITED STATES PATENT AND TRADEMARK OFFICE
CERTIFICATE OF CORRECTION

PATENT NO. : 4,964,653

DATED : October 23, 1990

INVENTOR(S) : Kent L. Parker

It is certified that error appears in the above-identified patent and that said Letters Patent is hereby corrected as shown below: